(12) United States Patent
McLoughlin et al.

(10) Patent No.: US 10,640,052 B1
(45) Date of Patent: May 5, 2020

(54) RETRACTABLE CLOSURE FOR VEHICLE OPENING

(71) Applicants: John E McLoughlin, Hauppauge, NY (US); Phung Le, Lake Grove, NY (US)

(72) Inventors: John E McLoughlin, Hauppauge, NY (US); Phung Le, Lake Grove, NY (US)

( * ) Notice: Subject to any disclaimer, the term of this patent is extended or adjusted under 35 U.S.C. 154(b) by 69 days.

(21) Appl. No.: 16/286,474

(22) Filed: Feb. 26, 2019

(51) Int. Cl.
*B60R 9/06* (2006.01)
*E06B 9/262* (2006.01)

(52) U.S. Cl.
CPC .............. *B60R 9/065* (2013.01); *E06B 9/262* (2013.01); *E06B 2009/2625* (2013.01)

(58) Field of Classification Search
CPC .. B60R 9/065; E06B 9/262; E06B 2009/2625
See application file for complete search history.

(56) References Cited

U.S. PATENT DOCUMENTS

| | | | | |
|---|---|---|---|---|
| 4,444,239 A | * | 4/1984 | Haines | E06B 9/30 160/107 |
| 4,506,476 A | * | 3/1985 | Haines | B60J 1/2088 49/64 |
| 4,842,034 A | * | 6/1989 | Haines | B60J 1/2091 160/84.04 |
| 5,573,051 A | * | 11/1996 | Judkins | E06B 9/262 160/168.1 R |
| 5,692,550 A | * | 12/1997 | Ford | E06B 9/262 156/197 |
| 6,224,139 B1 | | 5/2001 | Weyand | |
| 6,328,090 B1 | * | 12/2001 | Anderson | E06B 7/30 160/107 |
| 9,861,847 B2 | | 1/2018 | McLoughlin | |
| 2016/0237739 A1 | * | 8/2016 | Lin | E06B 9/26 |

OTHER PUBLICATIONS

RV Shades. accessed from https://www.stevesblindsandwallpaper.com/blinds/product/6838-steves-rv-room-darkening-pleated-shade on Feb. 26, 2019.
R.O.M. Corporation,Next Generation Hose Bed Protection Brochure, accessed from https://www.romcorp.com/products/compartment-access/rom-cargo-covers on Jul. 18, 2018.
4Guys Fire Trucks, Hose Bed Covers, accessed from http://www.4guysfire.com/features-hosebedcover.htm on Jul. 6, 2018.
Gortite Aluminum Roll-Up Doors, accessed from https://dynatect.com/product/doors/aluminum-roll-up-doors/#resources on Jul. 6, 2018.

* cited by examiner

*Primary Examiner* — Lori L Lyjak
(74) *Attorney, Agent, or Firm* — Louise S. Heim

(57) ABSTRACT

A retractable closure for an opening in a vehicle includes a pleated panel and a pull cord assembly configured to move the panel from a retracted position to an extended position when pulled and to automatically return the panel to the retracted position when released. A first fastening assembly detachably secures an edge of the panel to the vehicle near a first edge of the opening, and a second fastening assembly is provided for detachably securing the opposite edge of the panel to the vehicle near a second edge of the opening opposite the first edge when the panel is in the retracted position.

20 Claims, 8 Drawing Sheets

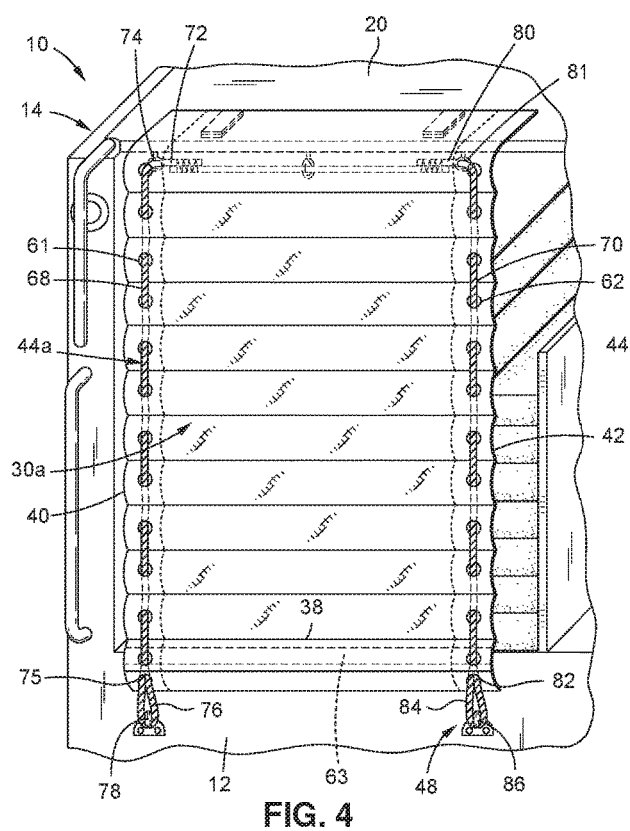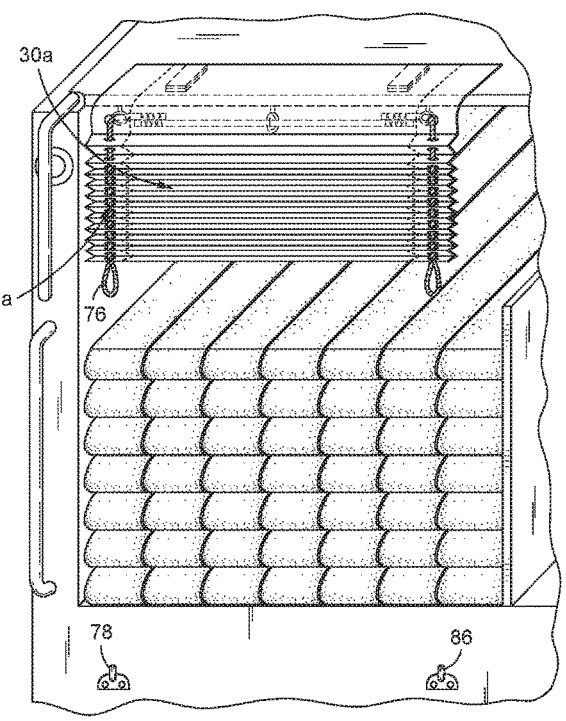

RETRACTABLE CLOSURE FOR VEHICLE OPENING

FIELD OF THE INVENTION

This invention relates to closures and more particularly to closures for openings in automotive vehicles.

BACKGROUND

Automotive vehicles such as trucks often have open beds for storing and transporting equipment. The open beds are convenient since they allow quick loading and unloading of the vehicles, but the items within are completely exposed, leaving them vulnerable to theft and damage from the elements. In addition, there is a risk that the items can fall or fly out of the bed when the vehicle is traveling at high speeds down a highway.

Certain vehicles, such as pick-up trucks, have upwardly opening beds that are relatively easy to cover with simple horizontally extending tarps that can be tied down with ropes or bungee cords. Other vehicles, such as certain types of fire trucks, have rearwardly opening beds. These beds are sometimes covered by vertically hanging tarps or by powered aluminum doors that either roll up or pivot outwardly. The non-powered tarps can be slow to open and close, making them less than ideal in emergency situations, while the powered doors are relatively expensive and vulnerable to electrical and mechanical failures. These and other problems are addressed by this disclosure as summarized below.

SUMMARY OF THE INVENTION

The present disclosure relates to a retractable closure for protecting the contents of a bed or other opening in a vehicle. The closure comprises a pleated panel and a pull cord assembly configured to move the panel from a retracted position to an extended position when pulled and to automatically return the panel to the retracted position when released. A first fastening assembly is provided for detachably securing a first lateral edge of the panel to the vehicle along a first lateral edge of the opening, and a second fastening assembly is configured to secure the second lateral edge of the panel to the vehicle to retain the panel in the extended position. The closure may also include a third fastening assembly secured to the first lateral edge of the panel and configured to retain the panel in the retracted position.

In one aspect of the disclosure, the panel includes a plurality of holes extending parallel to the longitudinal edges of the panel, and the pull cord assembly comprises a pull cord extending through the plurality of holes, the pull cord including a first end secured to the vehicle proximate the first lateral edge of the panel and a second end extending beyond the second lateral edge of the panel. In a preferred embodiment, the pull cord is formed of resilient elastic material, and its second end includes an attachment member configured to engage a corresponding attachment member on a surface of the vehicle near the second lateral edge of the panel.

In another aspect of the disclosure, the panel includes a first set of holes extending parallel to a first longitudinal edge of the panel and a second set of holes extending parallel to a second longitudinal edge of the panel, and the pull cord assembly comprises a first pull cord extending through the first set of holes and a second pull cord extending through the second set of holes, each pull cord including a first end secured to a first surface of the vehicle proximate the first lateral edge of the panel and a second end extending beyond the second lateral edge of the panel.

The pull cord assembly may also comprise an elastic strap secured to the front or rear surface of the panel, the strap including a first end attached to the top lateral edge of the panel and a second end including an attachment member configured to releasably engage a corresponding attachment member on a surface of the vehicle proximate the second lateral edge of the panel.

In an embodiment including two pull cords, the first pull cord may include a first end that extends through and is supported by a first ring, and a second end that extends beyond the second lateral edge of the panel. The second pull cord may include a first end that extends through and is supported by a second ring, and a second end that extends beyond the second lateral edge of the panel. The first ring may be located near a corner of the panel between the first lateral edge and the first longitudinal edge, and the second ring may be located near a corner of the panel between the first lateral edge and the second longitudinal edge.

In another aspect of the disclosure, the closure includes two pleated panels configured to cover two adjacent portions of the opening.

In yet another aspect of the disclosure, the pleated panel comprises a plurality of horizontally extending strips stitched to one another on alternating sides of the panel.

In still another aspect of the disclosure, the closure is configured to cover the opening in a vertical wall of a vehicle having a roof with an upper side and an underside, and includes a pleated panel configured to extend vertically over the opening, and a pull cord assembly configured to move the panel from a retracted position to an extended position when pulled and to automatically return the panel to the retracted position when released. A first fastening assembly is provided for detachably securing the top of the panel to the upper side of the roof of the vehicle, and a second fastening assembly is provided for detachably securing the bottom of the panel to the vertical wall of vehicle. A support member may be provided inside the bottom edge of the panel to stiffen and add weight to the bottom edge.

In this aspect, the pull cord assembly includes a pair of pull cords. The top end of the first pull cord extends through and is supported by a first ring that depends from the roof of the vehicle near a corner of the panel between the panel top edge and a first panel side edge, and the top end of the second pull cord extends through and is supported by a second ring that depends from the roof of the vehicle near a corner of the panel between the panel top edge and a second panel side edge. The bottom end of each pull cord includes a first attachment member that engages a second attachment member on the rear wall of the vehicle near the bottom panel lateral edge.

In another aspect of the disclosure, an automotive vehicle closure assembly comprises an automotive vehicle and a closure. The automotive vehicle includes a roof having an upper side and an underside, and a vertical wall defining a vertical opening. The closure includes pleated panel extending vertically over the opening, and a pull cord assembly coupled to the vehicle and configured to move the panel from a retracted position to an extended position when pulled, and to automatically return the panel to the retracted position when released. A first fastening assembly is provided for detachably securing the top of the panel to the upper side of the roof of the vehicle, and a second fastening assembly is provided for detachably securing the bottom of the panel to the vertical wall of vehicle. A support member may be provided inside the bottom edge of the panel to stiffen and add weight to the bottom edge.

In still another aspect of the disclosure, each of the panels of the closures includes an air flow portion configured to let air pass through the panels. In a preferred embodiment, the central air portion comprises a strip of mesh material that extends vertically down the center of panel. This prevents air from getting trapped behind the panels and causing the closure to balloon outwardly.

BRIEF DESCRIPTION OF THE DRAWINGS

The foregoing and more specific objects and advantages of the instant invention will become clear to those skilled in the art from the following detailed description of the preferred embodiments thereof taken in conjunction with the drawings in which:

FIG. 4 is a perspective view showing a single panel and pull cord assembly in a fully extended configuration over a single compartment of the vehicle;

FIG. 5 is a perspective view similar to FIG. 4, showing the panel and pull cord assembly in a retracted position;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
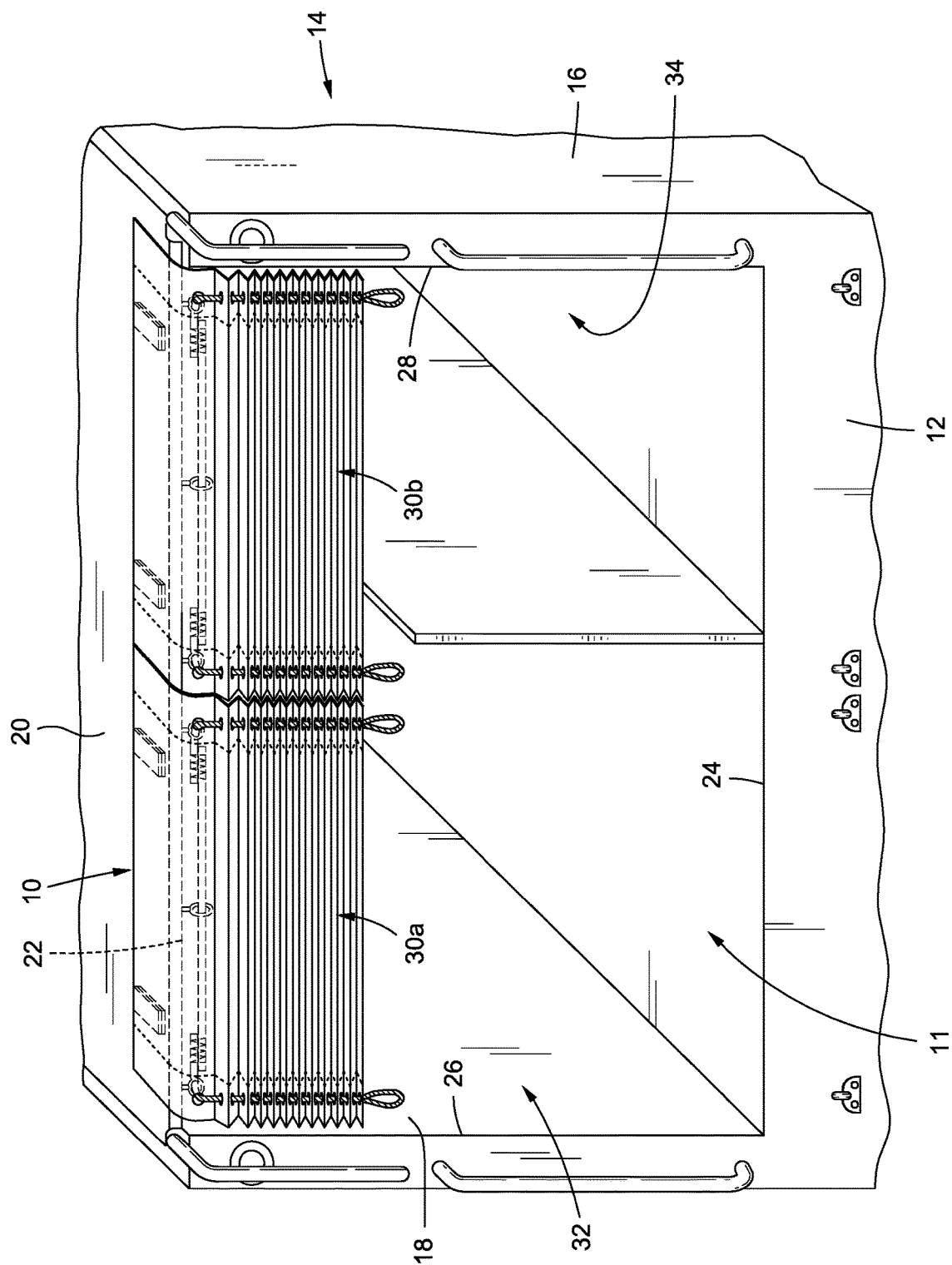
FIG. 1 is a perspective view showing a closure according to the present disclosure, in a retracted configuration over a vertical opening in the rear of a vehicle.

Turning now to the drawings, in which like numerals indicate corresponding elements throughout the several views, attention is first directed to FIG. 1, which shows a closure according to the present disclosure, indicated in its entirety by the numeral 10, over an opening 11 in a vertical wall 12 in the rear end of a fire truck 14 having a pair of side walls 16, 18 and a roof 20. The opening 11 is defined by a first lateral opening edge 22, a second lateral opening edge 24, a first longitudinal opening edge 26, and a second longitudinal opening edge 28. The closure 10 includes two pleated panels 30a, 30b, which in this figure are retracted to reveal two compartments 32, 34 in the interior of the vehicle 14. The left panel 30a protects and controls access to the left compartment 32, which may serve as a hose bed, while the right panel 30b protects and controls access to the right compartment 34, which may be used to store and transport other equipment. The number of pleated panels may vary, depending on the configuration of the vehicle 12. For some vehicles, a single pleated panel covering the entire opening 11 may suffice, while for some vehicles, particularly those having a several distinct compartments, it may be desirable to have three or more adjacent panels.

Figure 2:
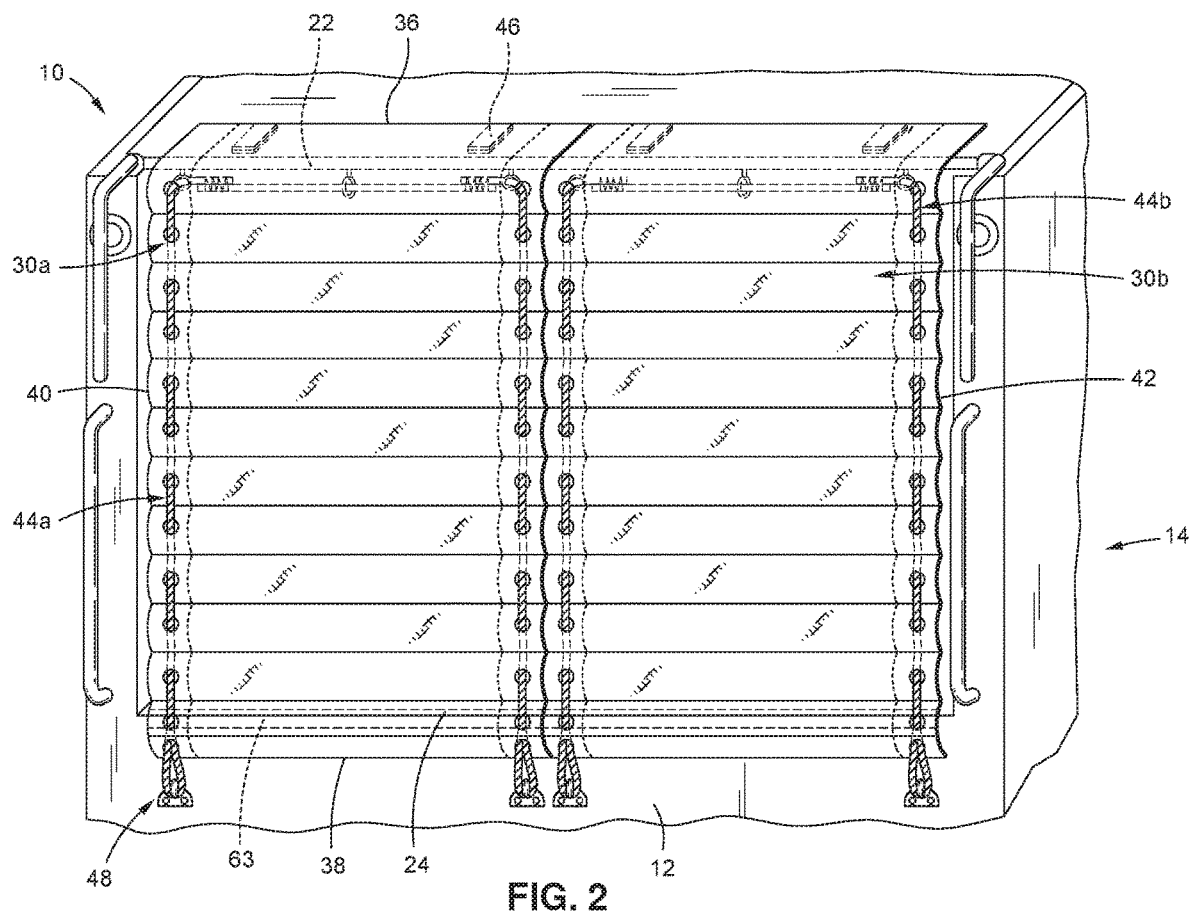
FIG. 2 is a perspective view similar to FIG. 1, showing the closure in a fully extended configuration.

As can be seen more clearly in FIG. 2, which shows both panels 30a, 30b in an extended configuration, each panel includes a first panel lateral edge 36, which extends parallel to the first lateral opening edge 22, a second panel lateral edge 38, which extends parallel to the second lateral opening edge 24, a first panel longitudinal edge 40, and a second panel longitudinal edge 42. Since the closure in this embodiment is hanging vertically over the rear opening of the vehicle 12, the first panel lateral edge 36 may be referred to as the top edge; the second panel lateral edge 38 may be referred to as the bottom edge; and the panel longitudinal edges 40, 42 may be referred to as the side edges. It will be readily understood however, that the closure 10 may also extend horizontally over upwardly opening beds, in which case, terms such as "top" and "bottom" do not apply. Similarly, although the panel lateral edges 36, 38 are shown in FIGS. 1 and 2 to be shorter than the panel longitudinal edges 40, 42, the terms "lateral" and "longitudinal" are not to be limited to their conventional meanings. Rather, for the purposes of this disclosure, the longitudinal edges of the panel are to be understood as the edges that extend in the direction of movement of the panels, while the lateral edges are the edges that extend perpendicular to the longitudinal edges.

Each panel 30a, 30b of the closure 10 is provided with a pull cord assembly 44a, 44b configured to move the panel from the retracted position shown in FIG. 1 to the extended position shown in FIG. 2 when pulled, and to return automatically to the retracted position when released. Each panel also includes a first fastening assembly 46 for detachably securing the first panel lateral edge 36 along the first lateral opening edge, and a second fastening assembly 48 for detachably securing the second panel lateral edge 38 to a portion of the vertical wall 12 below the second lateral opening edge 24 to retain the panel in the extended position. The first fastening assembly 46 may comprise mating strips of hook and loop-type fasteners such as VELCRO®, as illustrated here, or other fasteners such as snaps, hooks, bolts, or the like. The second fastening assembly 48 will be described in greater detail below.

Figure 3:
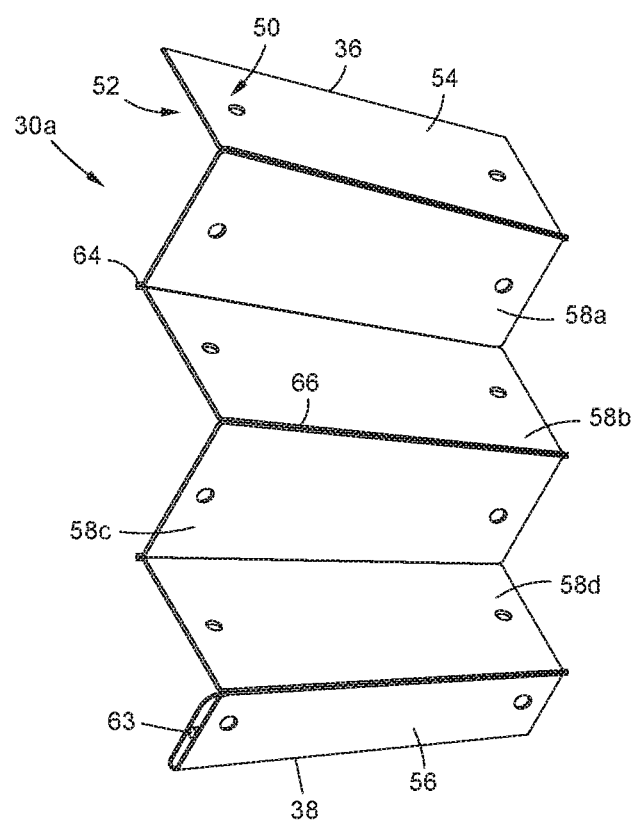
FIG. 3 is a perspective view, taken from a side, showing a single panel of the closure in a partially extended configuration.

As best seen in FIG. 3, a single panel 30a comprises an obverse surface 50 and a reverse surface 52. For the purposes of this disclosure, the obverse surface 50 is the surface that faces outwardly from the vehicle and the reverse surface 52 is the surface that faces the interior of the vehicle. The panel 30 is made up of a plurality of transversely extending strips made of a sturdy, weatherproof material such as vinyl. The strips include a top strip 54, a bottom strip 56, and a plurality of intermediate strips 58a, b, c, d. The bottom strip 56 is doubled over to form an enclosure for a metal rod or tube 63 that serves to stiffen and weigh down the second panel lateral edge 38.

The intermediate strips 58a, b, c, d are stitched to one another in such a way that the allowances for the seams joining adjacent strips are disposed on alternating surfaces of the panel 30a. For example, the allowance 64 for the seam between strips 58a and 58b is on the reverse side 52 of the panel 30a, while the allowance 66 for the seam between strips 58b and 58c is on the obverse side 50 of the panel. This alternating seam structure reinforces the tendency of adjacent strips to fold in opposite directions to one another, thus biasing the panel 30a to a retracted position.

As shown in FIGS. 4 and 5, the pull cord assembly 44a for the first panel 30a includes a pair of pull cords 68, 70 each of which is threaded through one of the two sets of holes 61, 62 extending along the panel longitudinal edges 40, 42, as well as through aligned holes in the ends of the stiffening tube 63. The pull cords 68, 70 are preferably bungee cords, or other similar cords made of durable, resilient, and highly elastic material. Alternatively, they could be made of a less stretchy material coupled to springs or other biasing elements.

The first pull cord 68 has a first end 72 supported by a first ring 74 depending from the underside of the roof 20 of the vehicle 14, and a second end 75 that extends beyond the second panel lateral edge 38. A first loop 76 formed at the second end 75 of the first pull cord 68 cooperates with a first hook 78 projecting from the vertical wall 12 of the vehicle 14. Similarly, the second pull cord 70 has a first end 80 supported by a second ring 81 depending from the underside of the roof 20 of the vehicle 14, and a second end 82 that extends beyond the second panel lateral edge 38. A second loop 84 formed at the second end 82 of the second pull cord 70 cooperates with a second hook 86 projecting from the vertical wall 12 of the vehicle 14. Together, the loops, 76, 84 and hooks 78, 86 act as the second fastening assembly 48, holding the pull cords 68, 70 in tension, and detachably securing the panel bottom edge 38 to the vertical wall 12 of the vehicle 14 when the panel is in the extended position. When the loops 76, 84 are released from the hooks 78, 86, the pull cords 68, 70 relax, causing them to snap upwardly, quickly bringing the panel 30a into the retracted position shown in FIG. 5.

Figure 6:
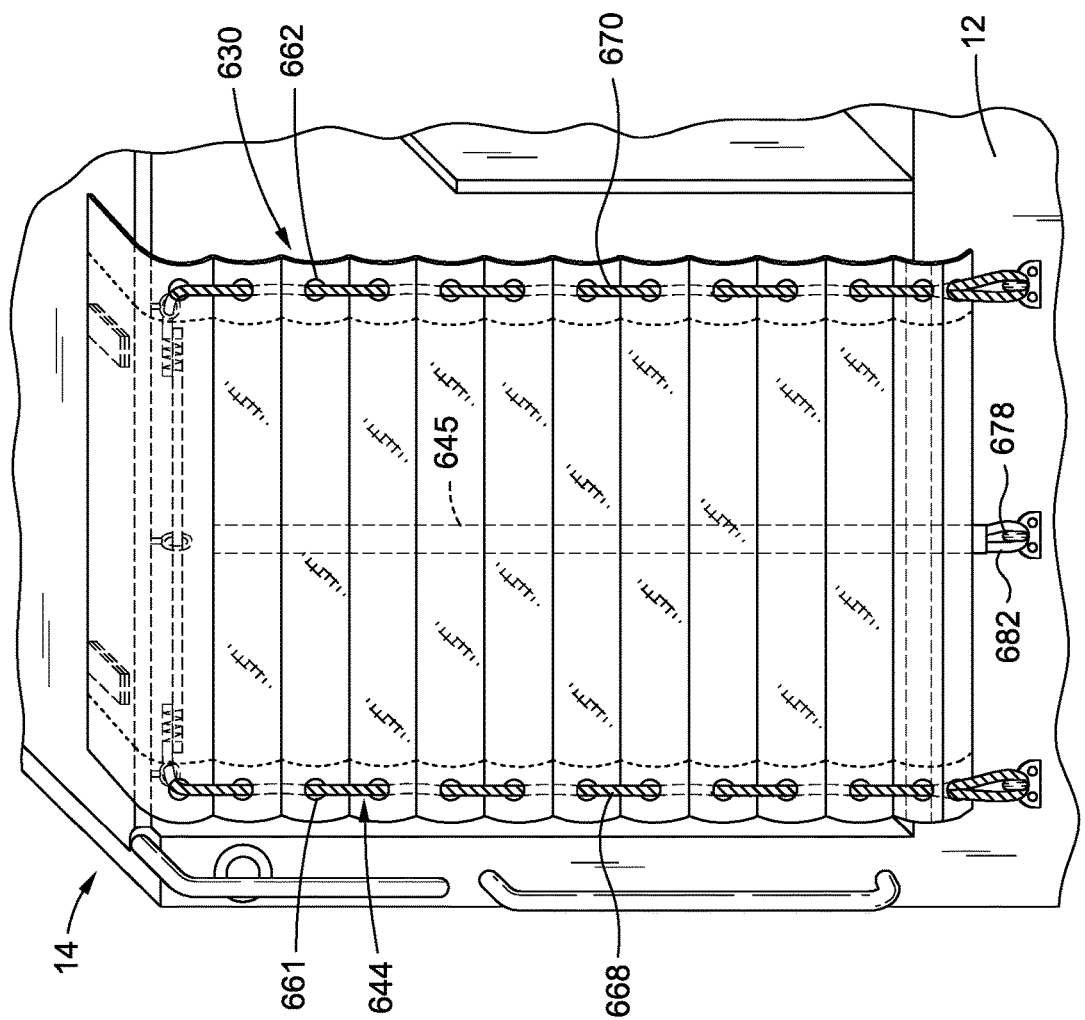
FIG. 6 is a perspective view, similar to FIG. 4, showing an alternate embodiment of the disclosure.

FIG. 6 shows a closure panel 630 according to an alternate embodiment of the disclosure, wherein the pull cord assembly 644 includes a strap 645 of elastic webbing that is stitched to the reverse surface of the panel 30, midway between the pull cords 668 and 670. The strap 645 terminates in a loop 678 that cooperates with a hook 682 on the vertical wall 12 of the vehicle 14 to hold the strap 645 in tension and secure the closure panel 630 in the closed configuration. Stitched-on straps of elastic webbing may be used, as illustrated here, in addition to the pull cords 668, 670 and holes 661, 662, or in other embodiments, may be used in place of one or both the pull cords 668, 670 and holes 661, 662.

Figure 7:
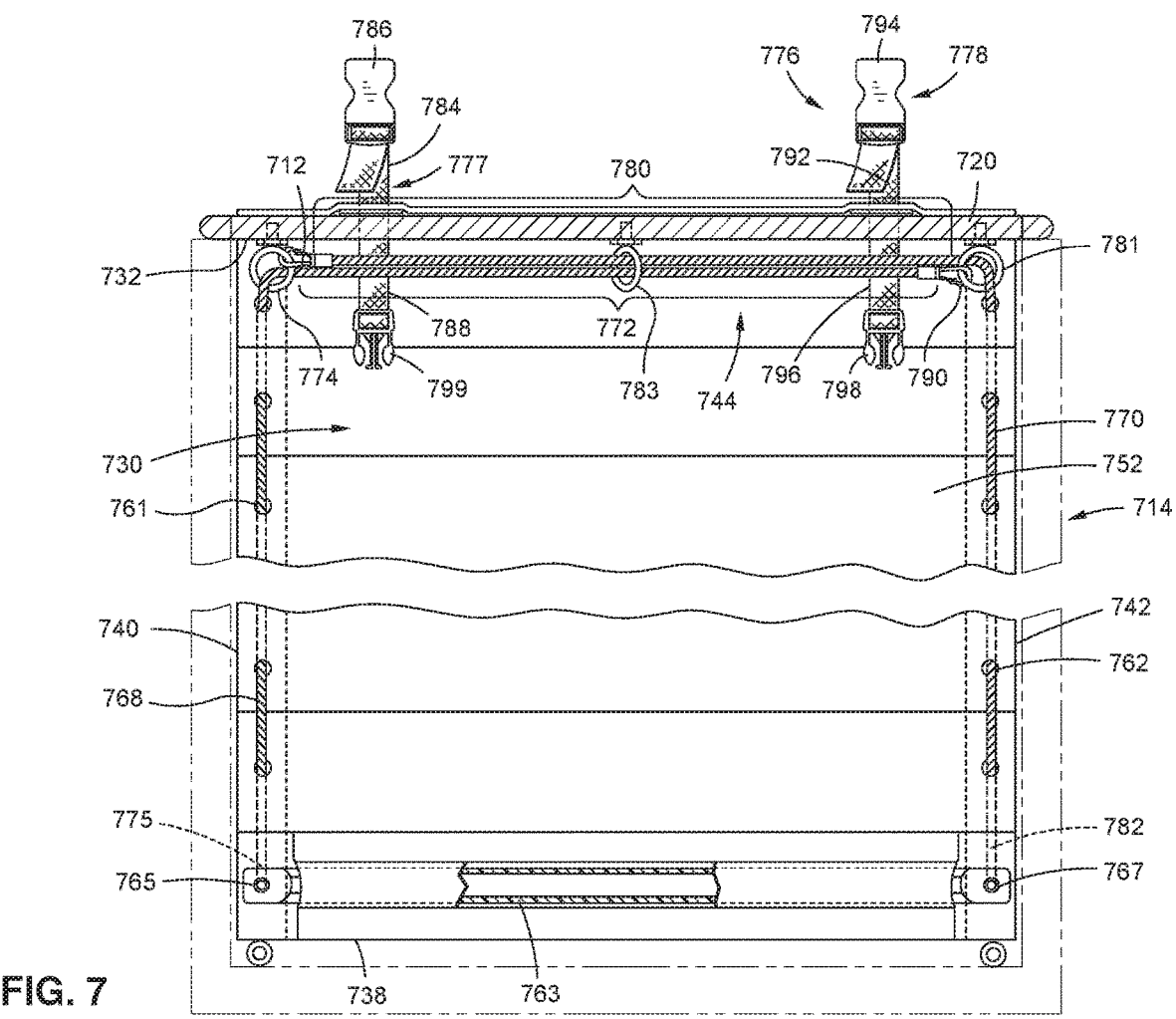
FIG. 7 is a view showing the reverse side of a closure according to another embodiment of the disclosure.

FIG. 7 shows the reverse surface 752 of a closure panel 730 according to an alternate embodiment of the disclosure. As in the previous embodiment, the closure panel 730 includes a first panel lateral edge 732, a second panel lateral edge 738, a first panel longitudinal edge 740, and a second panel longitudinal edge 742. A stiffening tube 763 is provided inside the panel 730 near the second panel lateral edge 738.

The pull cord assembly 744 for the closure panel 730 includes a first pull cord 768 and a second pull cord 770. The first pull cord 768 is threaded through a first set of holes 761 extending along the first panel longitudinal edge 740, and the second pull cord 770 is threaded through a second set of holes 762 extending along the second panel longitudinal edge 742. A support assembly including first, second, and third rings 774, 781, and 783 depending from the underside of the roof 720 of the vehicle 714 is provided for attaching the pull cords 768, 770 to the vehicle. The first pull cord 768 has a first end 772 and a second end 775. The first end 772 of the first pull cord 768 is supported by first and third rings 774, 783 and terminates in a first hook 790 that detachably couples to the second ring 781. The second end 775 of the first pull cord 768 passes through a first hole 765 in the end of the stiffening tube 763 near the first panel longitudinal edge 740. The second pull cord 770 has a first end 780 and a second end 782. The first end 780 of the second pull cord 770 is supported by second and third rings 781, 783 and terminates in a second hook 792 that detachably couples to the first ring 774. The second end 782 of the second pull cord 770 passes through a second hole 767 in the end of the stiffening tube 763 near the second panel longitudinal edge 742.

In addition to first and second fastening assemblies which are similar or identical to the first and second fastening assemblies in the embodiments of FIGS. 1-6, the embodiment of FIG. 7 includes a third fastening assembly 776 for securing the panel 730 in a retracted position. The third fastening assembly 776 comprises a first belt 777 attached to the closure panel 730 and/or the roof 720 of the vehicle 714 near the first panel longitudinal edge 740, and a second belt 778 attached to the panel 730 and/or the roof 720 of the vehicle 714 near the second panel longitudinal edge 742. The first belt 777 includes a first upper end 784 that extends over the vehicle roof 720 and terminates in a first upper buckle element 786, and a first lower end 788 that extends below the vehicle roof 720 and terminates in a first lower buckle element 799. The second belt 778 includes a second upper end 792 that extends over the vehicle roof 720 and terminates in a second upper buckle element 794, and a second lower end 796 that extends below the vehicle roof 720 and terminates in a second lower buckle element 798. To secure the panel 730 in a retracted position, a user simply extends the first and second belts 777, 778 around the folded-up pleats of the panel 730, and attaches each lower buckle element 790, 798 to its mating upper buckle element 786, 794, locking the buckle elements 786, 790, 794, and 798 in place.

Figure 8:
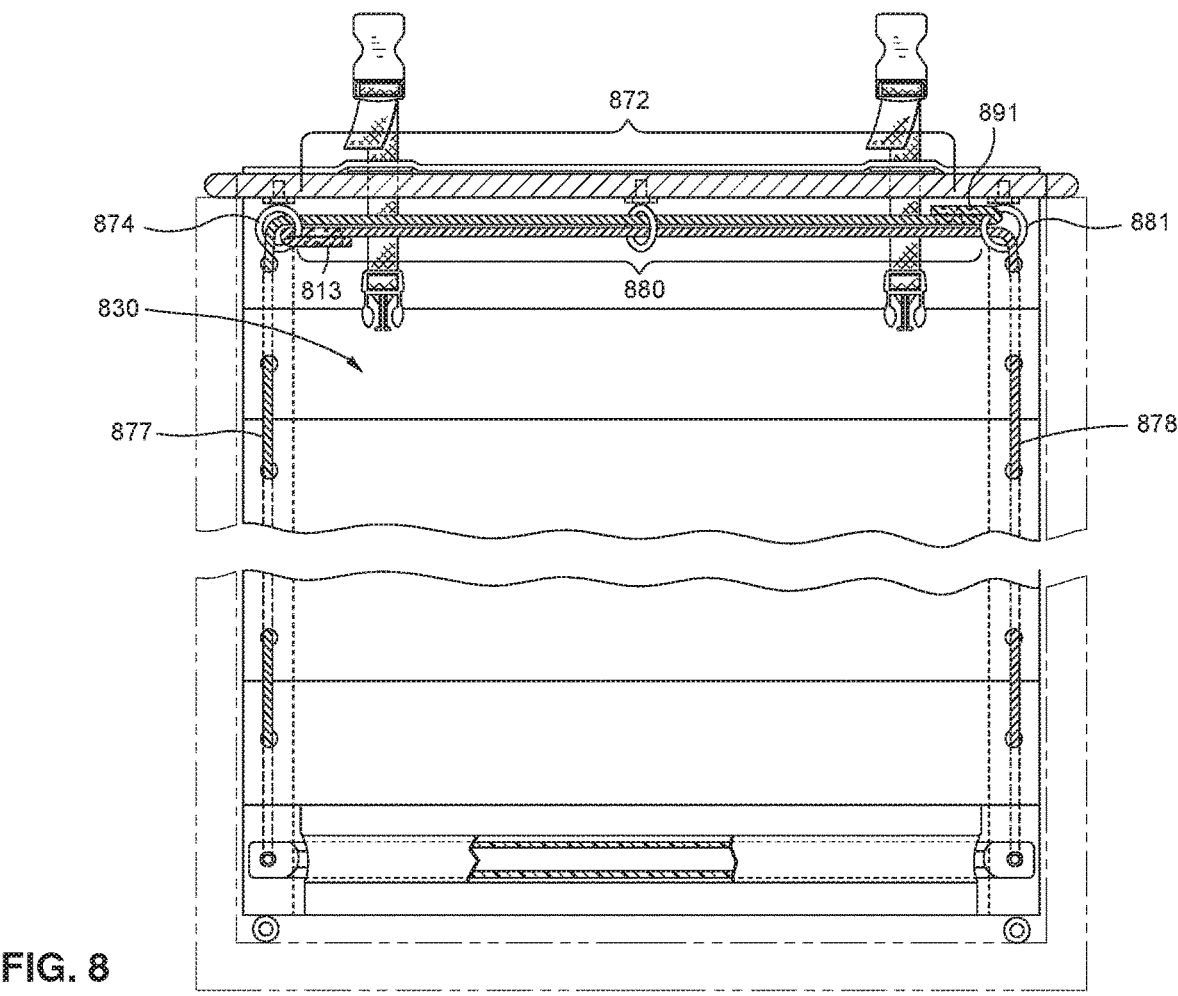
FIG. 8 is a view showing the reverse side of a closure according to yet another embodiment of the disclosure.

A closure panel 830 according to another embodiment of the disclosure, shown in FIG. 8, is substantially the same as the embodiment of FIG. 7, except that the upper ends 872, 880 of the first and second pull cords, 877, 878, respectively, are permanently, rather than detachably, secured to the second and first rings 881, 874, respectively. The terminal portion 891 of the first end 872 of the first pull cord 877 extends through the second ring 881, folds back over itself, and is stitched or riveted in place. Similarly, the terminal portion 813 of the first end 880 of the second pull cord 878 extends through the first ring 874, folds back over itself, and is stitched or riveted in place.

Figure 9:
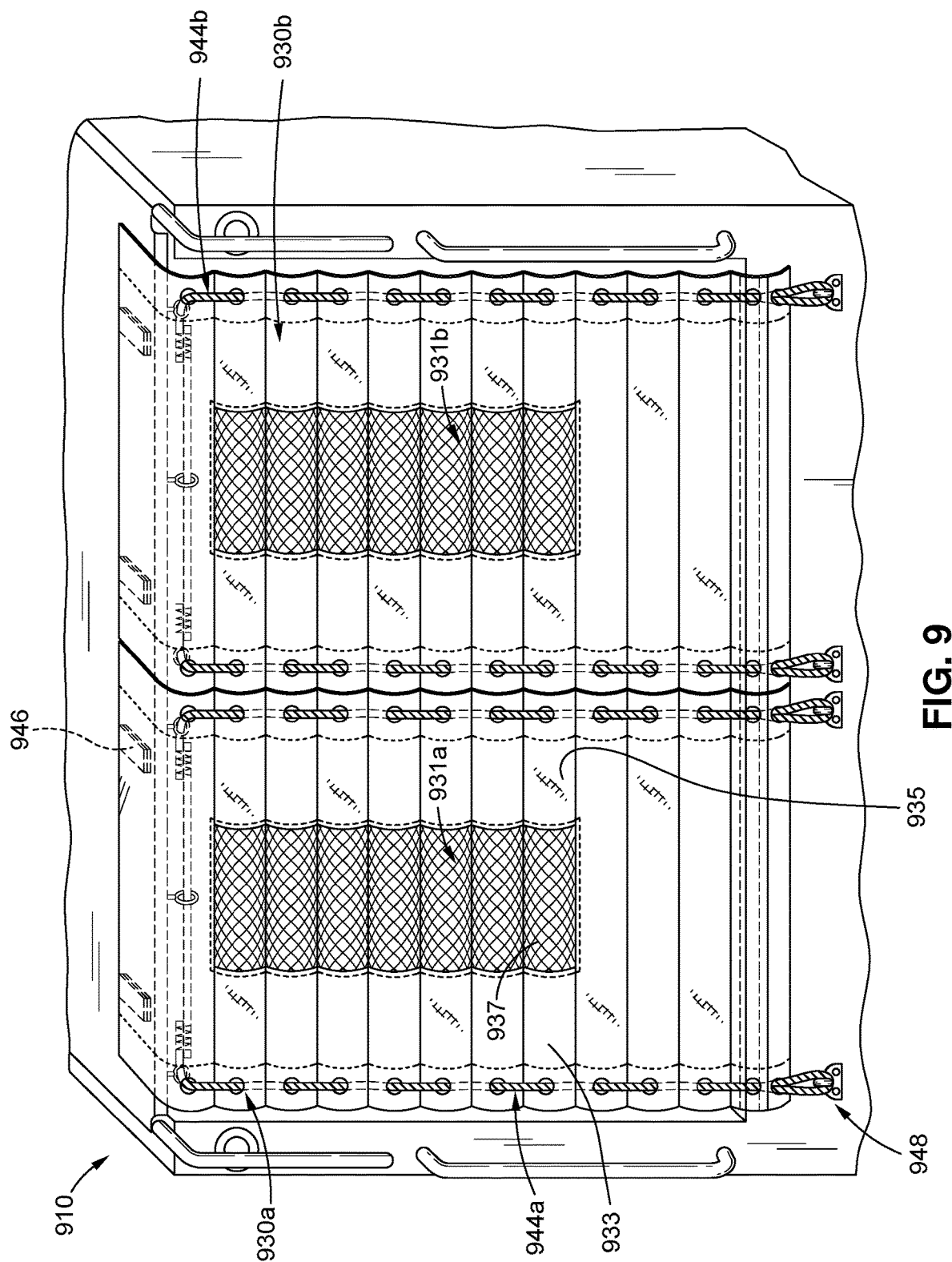
FIG. 9 is a perspective view, similar to FIG. 2, showing an alternate embodiment of the disclosure.

In another embodiment, shown in FIG. 9, each of the panels 930a, 930b of the closure 910 includes an air flow portion 931a, 931b that allows air to pass free thoroughly the panel. In this embodiment, each air flow portion 931a, 932b comprises a strip of mesh material that extends vertically down the center of the panel 930a, 930b. Each air flow portion 931a, 931b preferably has a length that is approximately two-thirds of the length of each panel 930a, 930b and a width that is approximately one-third of the width of each panel 930a, 930b. Thus, instead of being constructed solely of a plurality of one-piece horizontal strips as in the embodiment of FIGS. 1-8, the upper thirds of each panel 930a, 930b includes plurality of three-piece strips, wherein each strip includes a solid outer edge portion 933 joined to a solid inner edge portion 935 by a perforated or mesh portion 937. The mesh portion may be made from various materials, but 2" vinyl mesh has been found to be particularly suitable. The central air flow portion allows air to flow freely through the panels 30a, 30b, preventing the "balloon effect" which can occur when a vehicle having solid closure panels moves at high speed, or when winds are high.

The pull cord assemblies 944a, 944b, and the fastening assemblies 946, 948 shown in FIG. 9 are the same as their counterparts in FIG. 2. However, the three-part, solid and mesh strip construction of this embodiment, may be also combined with other embodiments of pull cord assemblies and fastening assemblies.

While the principles of the invention have now been made clear in the illustrated embodiment, there may be immediately obvious to those skilled in the art many modifications of structure, arrangements, proportions, elements, materials, and components used in the practice of the invention and otherwise, which are particularly adapted for specific environments and operation requirements without departing from those principles. The appended claims are therefore intended to cover and embrace any such modifications within the limits only of the true spirit and scope of the invention.

What is claimed is:

1. A closure for covering an opening in a vehicle, comprising:
    a pleated panel having a first panel lateral edge, a second panel lateral edge, and a pair of panel longitudinal edges;
    a pull cord assembly coupled to the panel and configured to move the panel from a retracted position to an extended position when pulled and to automatically return the panel to the retracted position when released;
    a first fastening assembly attached to the first panel lateral edge of the panel and configured to secure the first panel lateral edge to the vehicle near a first lateral edge of the opening; and
    a second fastening assembly coupled to the pull cord assembly and configured to secure the second panel lateral edge to the vehicle near a second lateral edge of the opening to retain the panel in the extended position.

2. The closure according to claim 1 further comprising a third fastening assembly configured to retain the panel in the retracted position.

3. The closure according to claim 1, wherein:
    the panel includes a plurality of holes extending parallel to the panel longitudinal edges; and
    the pull cord assembly comprises a pull cord extending through the plurality of holes, the pull cord including a first end secured to the vehicle proximate the first panel lateral edge and a second end extending beyond the second panel lateral edge.

4. The closure according to claim 3, wherein the pull cord is formed of resilient elastic material that is held in tension when the second end of the pull cord is secured to the vehicle with the second fastening assembly.

5. The pull cord assembly according to claim 4, wherein the second fastening assembly comprises a first attachment member provided at the second end of the pull cord and configured to engage a second attachment member on a surface of the vehicle proximate the second panel lateral edge.

6. The closure according to claim 1, wherein:
    the panel includes a first set of holes extending parallel to a first longitudinal panel edge, and a second set of holes extending parallel to a second panel longitudinal edge; and
    the pull cord assembly comprises a first pull cord extending through the first set of holes extending and a second pull cord extending through the second set of holes, each pull cord including a first end secured to the vehicle proximate the first panel lateral edge and a second end extending beyond the second panel lateral edge.

7. The closure according to claim 1, wherein the pull cord assembly comprises an elastic strap secured to a surface of the panel, the strap including a first end attached to the panel top lateral edge and a second end including an attachment member configured to releasably engage a corresponding attachment member on a surface of the vehicle proximate the second panel lateral edge.

8. The closure according to claim 6, wherein:
    the first end of the first pull cord extends through and is supported by a first ring secured to the vehicle near a corner of the panel between the first lateral panel edge and the first panel longitudinal edge, and
    the first end of the second pull cord extends through and is supported by a second ring secured to the vehicle near a corner of the panel between the first lateral panel edge and the second panel longitudinal edge.

9. The closure according to claim 8, wherein the second fastening assembly comprises a first attachment member coupled to the second end of each pull cord and configured to engage a second attachment member on a surface of the vehicle proximate the second panel lateral edge.

10. The closure according to claim 1, wherein:
    the pleated panel includes
        an obverse surface,
        a reverse surface, and
            a plurality of transversely extending strips, each strip having a pair of elongated strip edges extending parallel to the panel lateral edges, wherein
        each strip is stitched to a first adjacent strip at a first seam defining a first seam allowance and to a second adjacent strip at a second seam defining a second seam allowance, and wherein
        the first seam allowance is disposed on the obverse surface of the panel, and
        the second seam allowance is disposed on the reverse surface of the panel.

11. The closure according to claim 1, wherein the panel includes an air-flow section allowing air to pass through the panel.

12. The closure according to claim 11, wherein at least one of the transversely extending strips comprises:
    an outer edge portion;
    an inner edge portion; and
    a central portion connecting the inner portion to the outer portion;
    wherein the outer and inner portions are formed of a solid material, and the central portion is formed of a material having openings allowing air to pass freely through the panel.

13. A closure for covering an opening in a vertical wall of a vehicle having a roof with an upper side and an underside, the closure comprising:
    a pleated panel configured to extend vertically over the opening, the panel having a panel top edge, a panel bottom edge, and a pair of panel side edges;
    a pull cord assembly coupled to the panel and configured to move the panel from a retracted position to an extended position when pulled and to automatically return the panel to the retracted position when released;
    a first fastening assembly secured to panel along the panel top edge and configured to detachably secure the panel top edge to the upper side of the roof of the vehicle; and
    a second fastening assembly coupled to the pull cord assembly and configured to detachably secure the panel bottom edge to the vertical wall of vehicle when the panel is in the extended position.

14. The closure according to claim 13, wherein:
the pull cord assembly includes a first set of holes extending parallel to a first longitudinal panel edge, and a second set of holes extending parallel to a second panel longitudinal edge, each pull cord including a first end secured to the vehicle proximate the first panel lateral edge and a second end extending beyond the second panel lateral edge; and
the first end of the first pull cord extends through and is supported by a first ring secured to the underside of the roof of the vehicle near a corner of the panel between the top panel edge and a first panel side edge, and
the first end of the second pull cord extends through and is supported by a second ring secured to the underside of the roof of the vehicle near a corner of the panel between panel top edge and a second panel side edge.

15. The closure according to claim 13, further comprising a support member provided inside the panel bottom edge and configured to stiffen and add weight to the panel bottom edge.

16. The closure according to claim 13, wherein:
the pleated panel includes
an obverse surface,
a reverse surface, and
a plurality of transversely extending strips, each strip having a pair of elongated strip edges extending parallel to the panel lateral edges, wherein
each strip is stitched to a first adjacent strip at a first seam defining a first seam allowance and to a second adjacent strip at a second seam defining a second seam allowance, and wherein
the first seam allowance is disposed on the obverse surface of the panel, and
the second seam allowance is disposed on the reverse surface of the panel.

17. An automotive vehicle closure assembly comprising:
an automotive vehicle including
a roof having an upper side and an underside, and
a vertical wall defining a vertical opening; and
a closure including
a pleated panel extending vertically over the opening, the panel including a panel top edge, a panel bottom edge, and a pair of panel side edges,
a pull cord assembly coupled to the panel and configured to move the panel from a retracted position to an extended position when pulled and to automatically return the panel to the retracted position when released,
a first fastening assembly detachably securing the panel top edge to the upper side of the roof of the vehicle, and
a second fastening assembly coupled to the pull cord assembly and detachably securing the panel bottom edge to the vertical wall of the vehicle.

18. The closure assembly according to claim 17, wherein the pull cord assembly comprises:
a first ring secured to the underside of the roof of the vehicle near a corner of the panel between the panel top edge and the first panel side edge;
a second ring secured to the underside of the roof of the vehicle near a corner of the panel between panel top edge and a second panel side edge;
a first pull cord threaded through a first set of holes formed in the panel along a first panel side edge, the first pull cord having an upper portion extending through and supported by the first ring and secured to the second ring; and
a second pull cord threaded through a second set of holes formed in the panel along a second side edge, the second pull cord having an upper portion extending through and supported by the second ring and secured to the first ring.

19. The closure assembly according to claim 17, further comprising a support member provided inside the panel bottom to stiffen and add weight to the panel bottom edge.

20. The closure assembly according to claim 19, wherein the pleated panel includes
an obverse surface,
a reverse surface, and
a plurality of transversely extending strips, each strip having a pair of elongated strip edges extending parallel to the panel lateral edges,
wherein
each strip is stitched to a first adjacent strip at a first seam defining a first seam allowance and to a second adjacent strip at a second seam defining a second seam allowance, and wherein
the first seam allowance is disposed on the obverse surface of the panel, and
the second seam allowance is disposed on the reverse surface of the panel.

* * * * *